United States Patent [19]
McCready et al.

[11] Patent Number: 4,714,753
[45] Date of Patent: Dec. 22, 1987

[54] THERMOPLASTIC POLYETHERIMIDE ESTER ELASTOMERS EXHIBITING IMPROVED HYDROLYTIC STABILITY

[75] Inventors: Russell J. McCready; John A. Tyrell, both of Mt. Vernon, Ind.

[73] Assignee: General Electric Company, Pittsfield, Mass.

[21] Appl. No.: 936,529

[22] Filed: Dec. 1, 1986

[51] Int. Cl.$^4$ .............................................. C08G 63/18
[52] U.S. Cl. .................................. 528/288; 525/437; 528/289; 528/292; 528/296
[58] Field of Search ............... 528/288, 289, 292, 296; 525/437

[56] References Cited

U.S. PATENT DOCUMENTS

| | | | |
|---|---|---|---|
| 4,371,693 | 2/1983 | Wolfe .................................... | 528/292 |
| 4,556,688 | 12/1985 | McCready et al. ................... | 525/33 |
| 4,556,705 | 12/1985 | McCready ............................ | 528/289 |
| 4,661,582 | 4/1987 | McCready ............................ | 528/292 |
| 4,673,726 | 6/1987 | Jackson et al. ...................... | 528/288 |

Primary Examiner—Lucille M. Phynes
Attorney, Agent, or Firm—William F. Mufatti

[57] ABSTRACT

Polyetherimide ester compositions exhibiting improved hydrolytic stability are provided. These polymers are comprised of the reaction products of:
  (i) at least one diol;
  (ii) at least one dicarboxylic acid or an ester forming reactive derivative thereof; and
  (iii) a set of reactants selected from either
   (a) (i) an amount at least effective to improve the hydrolytic stability of said composition of at least one high molecular weight bisaminoalkyl polytetrahydrofuran, and (ii) at least one tricarboxylic acid or derivative thereof, or
   (b) an amount at least effective to improve the hydrolytic stability of said composition of at least one polyoxytetramethylene dialkylenediimide diacid, said polyoxytetramethylene dialkylenediimide diacid being the reaction product of (iii)(a)(i) and (iii)(a)(ii).

The polymers of the instant invention are useful for production of extruded and molded parts requiring improved hydrolytic stability.

35 Claims, No Drawings

THERMOPLASTIC POLYETHERIMIDE ESTER ELASTOMERS EXHIBITING IMPROVED HYDROLYTIC STABILITY

BACKGROUND OF THE INVENTION

Poly(etherimide ester) elastomers comprised of the reaction products of (a) a diol, (b) a dicarboxylic acid, (c) a poly(oxy alkylene)diamine, and (d) a tricarboxylic acid or its derivatives are known and described in U.S. Pat. Nos. 4,544,734 and 4,556,705 to McCready and in U.S. Pat. No. 4,556,688 to McCready et al. These poly(etherimide ester) elastomers exhibit excellent stress-strain properties, low tensile set, high melting temperatures and/or excellent strength/toughness characteristics as well as superior flexibility which are especially suitable for molding and extrusion applications.

It has now been discovered that poly(etherimide ester) elastomers can be provided which exhibit improved hydrolytic stability while exhibiting the advantageous properties of the class of poly(etherimide ester) elastomers. These poly(etherimide ester) polymers are advantageous for use in applications requiring good hydrolytic stability of parts fabricated from poly(etherimide ester) elastomers.

SUMMARY OF THE INVENTION

In accordance with the instant invention there are provided poly(etherimide ester) elastomers exhbiting improved hydrolytic stability. The elastomers of the instant invention are comprised of the reaction products of (a) at least one diol, (b) at least one dicarboxylic acid or an ester forming reactive derivative thereof, (c) at least one bisaminoalkyl polytetrahydrofuran, and (d) at least one tricarboxylic acid having two vicinal carboxyl groups or the anhydride thereof.

DESCRIPTION OF THE INVENTION

In accordance with the instant invention there are provided poly(etherimide ester) elastomers which exhibit improved or quite good hydrolytic stability. The poly(etherimide ester) polymers of the present invention, while exhibiting improved hydrolytic stability, also exhibit the advantageous properties of poly(etherimide ester) polymers derived from (a) a diol, (b) a dicarboxylic acid or its ester forming reactive derivatives, (c) a poly(oxyalkylene)diamine, and (d) at least one tricarboxylic acid.

The poly(etherimide ester) polymers of the present invention are comprised of the reaction products of:
(a) at least one diol;
(b) at least one dicarboxylic acid or an ester forming reactive derivative thereof;
(c) at least one bisaminoalkyl polytetrahydrofuran; and
(d) at least one tricarboxylic acid or a derivative thereof.

Suitable diols (a) for use in preparing the compositions of the instant invention include saturated and unsaturated aliphatic and cycloaliphatic dihydroxy compounds as well as aromatic dihydroxy compounds. These diols are preferably of a low molecular weight, i.e., having a molecular weight of about 250 or less. When used herein the term "diols" and "low molecular weight diols" should be construed as including equivalent ester forming derivatives thereof, provided, however, that the molecular weight requirement pertains to the diol only and not to its derivatives. Exemplary of ester forming derivatives there may be given the acetates of diols as well as, for example, ethylene oxide or ethylene carbonate for ethylene glycol.

Preferred saturated and unsaturated aliphatic and cycloaliphatic diols are those having from about 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4-dihydroxy cyclohexane, 1,2-, 1,3- and 1,4-cyclohexane dimethanol, butenediol, hexenediol, and the like. Mixtures of two or more of these diols may also be advantageously employed. Some illustrative non-limiting examples of particularly useful diol mixtures are those containing butanediol and cyclohexane dimethanol, particularly those mixtures containing at least in excess of 50 mole percent cyclohexanediol; and mixtures of butanediol, e.g., 1.4-butanediol, and butenediol, e.g., 2-butene-1,4-diol, particularly those mixtures which contain less than 70 mole percent butenediol. Especially preferred are 1,4-butanediol and mixtures thereof with hexanediol, butenediol, or cyclohexane dimethanol. The most preferred diol is butanediol.

The dicarboxylic acids (b) which are suitable for use in the practice of the present invention are the aliphatic, cycloaliphatic, and/or aromatic dicarboxylic acids. These acids are preferably of a low molecular weight, i.e., having a molecular weight of less than about 300, however, higher molecular weight dicarboxylic acids, especially dimer acids, may also be used. The term "dicarboxylic acids" as used herein includes the equivalents of dicarboxylic acids having two functional carboxyl groups which perform substantially like dicarboxylic acids in reactions with glycols and diols in forming polyester polymers. These equivalents include esters and ester-forming reactive derivatives such as, for example, the acid halides, e.g., diacid chlorides, and anhydrides. The molecular weight preference mentioned above pertains to the acid and not to its equivalent ester or ester-forming reactive derivative. Thus, an ester of a dicarboxylic acid having a molecular weight greater than 300 or an acid equivalent of a dicarboxylic acid having a molecular weight greater than 300 are included provided the acid has a molecular weight below about 300. Additionally, the dicarboxylic acids may contain any substituent group(s) or combinations which do not substantially interfere with the polymer formation and the use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a ring carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention include, for example, sebacic acid, 1,2-cyclohexane dicarboxylic acid, 1,3-cyclohexanedicarboxylic acid, 1,4- cyclohexane dicarboxylic acid, adipic acid, glutaric acid, succinic acid, oxalic acid, azelaic acid, diethylmalonic acid, allylmalonic acid, 4-cyclohexene-1,2-dicarboxylic acid, 2-ethylsuberic acid, tetramethylsuccinic acid, cyclopentanedicarboxylic acid, decahydro-1,5-naphthylene dicarboxylic acid, 4,4'-bicyclohexyl dicarboxylic acid, 4.4-methylenebis(cyclohexane carboxylic acid), 3,4-furan dicarboxylic acid, and 1,1-cyclobutane dicarboxylic acid. 4-furan dicarboxylic acid, and 1,1-cyclobutane-dicarboxylic acid. Preferred aliphatic acids are cyclohexane dicarboxylic acids, sebacic acid, pimelic acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(betahydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 6–16 carbon atoms are preferred, particularly the benzene dicarboxylic acids, i.e., phthalic, terephthalic and isophthalic acids and their dimethyl derivatives. Especially preferred is dimethyl terephthalate.

Mixtures of the aforedescribed acids may also be employed in the practice of the present invention. Thus, for example, mixtures of two or more different aliphatic dicarboxylic acids may be used; mixtures of two or more different aromatic dicarboxylic acids may be employed; or mixtures of at least one aliphatic and/or cycloaliphatic acid with at least one aromatic dicarboxylic acid may be utilized.

When mixtures of dicarboxylic acids are employed in the practice of the present invention it is preferred that at least about 60 mole percent, preferably at least about 80 mole percent, based on 100 mole percent of dicarboxylic acid (b) be the same dicarboxylic acid or ester derivative thereof. As mentioned above, the preferred compositions are those in which dimethyl terephthalate is the predominate dicarboxylic acid, most preferably when dimethyl terephthalate is the only dicarboxylic acid.

Finally, where mixtures of the dicarboxylic acids are employed in the practice of the present invention they do not contain any dimer acids, e.g., acids prepared by the dimerization of unsaturated fatty acids of 18 carbons such as oleic acid, linoleic acid and linolenic acid. That is to say, the dicarboxylic acid component (b), and consequently the poly(etherimide ester)polymer, is dimer acid free.

The bisaminoalkyl polytetrahydrofuran (c) suitable for use herein may be characterized by the following general formula $$H_2N-R^1-G-R^1-NH_2 \qquad \text{I}$$

wherein:

$R^1$ is an alkylene radical containing from 2 to about 6 carbon atoms; and

G is the radical remaining after the removal of the amino groups from a long chain tetrahydrofuran diamine, i.e., poly(oxy tetramethylene)diamine.

Some illustrative non-limiting examples of $R^1$ include the ethylene, propylene, butylene, and pentylene radicals.

These bisaminoalkyl polytetrahydrofurans are well known in the art and are generally commercially available or may readily be prepared by known and conventional processes. In general they are prepared by known processes for the amination of glycols. For example, they may be prepared by aminating glycol in the presence of ammonia, Raney nickel catalyst and hydrogen as set forth in Belgium Pat. No. 634,741. Alternately, they may be prepared by treating the glycol with ammonia and hydrogen over a Nickel-Copper-Chromium catalyst as taught by U.S. Pat. No. 3,654,370. Other methods taught for their production include those taught in U.S. Pat. Nos. 3,155,728 and 3,236,895, and French Pat. Nos. 1,551,605 and 1,466,708, all of which are incorporated by reference.

The long chain ether diamines suitable for use herein are polymeric diamines having terminal (or as nearly terminal as possible) alkyleneamine groups and an average molecular weight of from about 600 to about 12,000, preferably from about 900 to about 4,000. Additionally, they generally have a carbon-to-oxygen ratio of from about 3.5 to about 5.0.

Some illustrative non-limiting examples of the bisaminoalkyl polytetrahydrofurans of Formula I include bisaminoethyl polytetrahydrofuran, bisaminopropyl polytetrahydrofuran, and bisaminobutyl polytetrahydrofuran.

The tricarboxylic acid (d) may be almost any carboxylic anhydride containing an additional carboxyl group or the corresponding acid thereof containing two imide forming vicinal carboxyl groups in lieu of the anhydride group and an additional carboxyl group. Mixtures of these acids or anhydrides are also suitable. The additional carboxyl group must be esterifiable.

While trimellitic anhydride is preferred as the tricarboxylic acid component (d), any number of suitable tricarboxylic acid constituents may be used. Some illustrative non-limiting examples of these include 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4 butane tricarboxylic anhydride, and the like.

These tricarboxylic acids have the formula

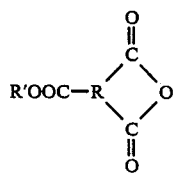

II.

wherein:

R is a trivalent organic radical, preferably a $C_2$–$C_{20}$ aliphatic or cycloaliphatic, or $C_6$–$C_{20}$ aromatic trivalent radical; and R' is hydrogen or a monovalent organic radical preferably selected from the group consisting of $C_1$–$C_6$ aliphatic and/or cycloaliphatic radicals and $C_6$–$C_{12}$ aromatic radicals, e.g., benzyl, and most preferably hydrogen.

The amount by which each of the foregoing reactants is employed in the preparation of the polymers of the present invention is not, in general, critical and depends, in part, upon the desired properties of the resultant polymer. Obviously, sufficient amounts of diol versus diacid and tricarboxylic acid versus diamine must be present, as recognized in the art, to allow for substantially complete polymerization.

This type of one-pot reaction involving the reactions of (a) a diol component, (b) a dicarboxylic acid component, (c) a bisaminoalkyl polytetrahydro-furan component, and (c) a tricarboxylic acid component is generally described in U.S. Pat. No. 4,556,588 to McCready et al., incorporated herein by reference. In this type of one-pot reaction the amount of diol (a) employed will be, in general, a molar excess, preferably about 1.5 molar equivalents, based on the combined molar equivalents of dicarboxylic acid component (b) and of the total moles of the tricarboxylic acid (d). The amount of tricarboxylic acid (d) employed will preferably be about two molar equivalents based on the number of moles of the bisaminoalkyl polytetrahydrofuran (c). Obviously, less than two molar equivalents would result in incomplete imidization of the diamine (c) resulting in potentially poorer properties. Conversely, greater than two molar equivalents of the tricarboxylic acid (d) may lead to cross-linking and/or branching of the polymer. Generally, mole ratios of 2 moles tricarboxylic acid (d) to 0.85 to 1.15 moles of bisaminoalkyl polytetrahydrofuran (c) have been found to yield useful polymers. Finally, the amount by which the dicarboxylic acid (b) and the diamine (c) are used will be such that the weight ratio of the theoretical amount of the polytetramethylene dialkylenediimide diacid formed from the diamine (c) and the tricarboxylic acid (d) to the dicarboxylic acid (b) will be from about 0.25 to about 2.0, preferably from about 0.4 to about 1.4.

The instant polyetherimide esters may also be prepared by a two-pot reaction involving the reactions of (a) the diol, (b) the dicarboxylic acid, and (e) a preformed polytetramethylene dialkylenediimide diacid. Such a two-pot reaction is generally described in U.S. Pat. No. 4,556,705 to McCready, incorporated by reference. Basically, in this process the bisaminoalkyl polytetrahydrofuran (c) is reacted with a tricarboxylic acid (d) to form a polytetramethylene dialkylenediimide diacid (e), and said diimide diacid (e) is then reacted with the diol (a) and the dicarboxylic acid (b) to form the polymer of the instant invention.

The polytetramethylene dialkylene diimide diacid (e) formed by the reactions of (c) and (d) is represented by the formula

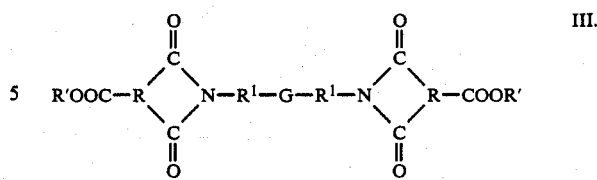

wherein G, R, R' and $R^1$ are as defined hereinafore.

The polyoxyalkylene diimide diacids of Formula III suitable for use herein are high molecular weight diimide diacids wherein the average molecular weight is greater than about 700, most preferably greater than about 900. They may be prepared by the imidization reaction of one or more tricarboxylic acid components (d) containing two vicinal carboxyl groups or an anhydride group and an additional carboxyl group which must be esterifiable with a high molecular weight bisaminoalkyl polytetrahydrofuran (c). The polyoxyalkylene diimide diacids and processes for their preparation are disclosed in U.S. Pat. No. 4,556,705 to McCready, incorporated by reference. Briefly, these polyalkylene diimide diacids may be prepared by known imidization reactions including melt synthesis or by synthesizing in solvent systems. Such reactions generally occur at temperatures from 100° C. to 300° C., preferably at from 150° C. to about 250° C. while drawing off water or in a solvent system at reflux temperature of the solvent or azeotropic (solvent) mixture.

In this two-pot process the weight ratio of the above ingredients, as in the one-pot process, is also not critical. However, it is preferred that the diol be present in at least a molar equivalent amount, preferably a molar excess, most preferably at least 150 mole % based on moles of dicarboxylic acid (b) and polyoxyalkylene diimide diacid (e) combined. Such molar excess of diol will allow for optimal yields, based on the amount of acids, while accounting for the loss of diol during esterification/condensation.

Further, while the weight ratio of the dicarboxylic acid (b) to polyoxyalkylene diimide diacid (e) is not critical, preferred compositions are those in which the weight ratio of the polyoxyalkylene diimide diacid (e) to dicarboxylic acid (b) is from about 0.25 to about 2.0, preferably from about 0.4 to about 1.4. The actual weight ratio will be dependent upon the specific polyoxyalkylene diimide diacid used and more importantly upon the desired physical and chemical properties of the resultant polyetherimide ester polymer.

It is likewise possible, as described in U.S. Pat. No. 4,556,588, to prepolymerize the aromatic dicarboxylic acid (b) and the diol (a) to form a prepolyester. Forming the prepolyester of (a) and (b) can be achieved by conventional esterification techniques as described in U.S. Pat. Nos. 2,465,319, 3,047,439 and 2,910,466, all of which are incorporated herein by reference.

In its preferred embodiments the composition of the instant invention will comprise the reaction products of dimethyl terephthalate, optionally with up to about 40 mole percent of another dicarboxylic acid; 1,4-butanediol, a mixture of 1,4-butanediol and either butenediol or cyclohexane dimethanol, or a mixture of 1,4-buatnediol and up to about 40 mole percent of another saturated or unsaturated aliphatic or cycloaliphatic diol; and either (1) a bisaminoalkyl polytetrahydrofuran of a molecular weight of from about 600 to about 12,000, preferably from about 900 to about 4,000, and trimellitic anhydride, or (2) a polyoxytetramethylene dialkylenediimide diacid prepared from a bisaminoalkyl polytetrahydrofuran of an average molecular weight of from about 600 to about 12,000, preferably from about 900 to about 4,000, and trimellitic anhydride.

The instant polyetherimide esters may be prepared by conventional esterification/condensation reactions for the production of polyesters. These processes are described, inter alia, in U.S. Pat. Nos. 3,763,109; 3,651,014 and 3,801,547, all of which are incorporated herein by reference, and in U.S. Pat. Nos. 4,556,705 and 4,556,688, also incorporated herein by reference.

The polyetherimide esters of the instant invention contain at least the following two general recurring structural units:

and

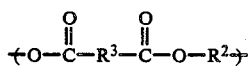

wherein:

A is the residue of the polyoxytetramethylene dialkylenediimide diacid, e.g.,

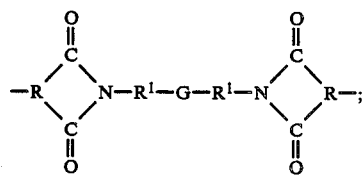

$R^2$ is the residue of the diol absent the two hydroxy groups; and $R^3$ is the residue of the dicarboxylic acid absent the two carboxyl groups.

In the process of the instant invention for the preparation of the polyetherimide ester elastomers, particularly where all the reactants are charged to the reactor together or where the polyoxytetramethylene dialkylenediimide diacid is preformed and excess tricarboxylic acid is present, a minor amount of tricarboxylic acid or anhydride may react with the available hydroxyl groups and ultimately function as a branching agent in the finished polymer. Within limits, the degree of branching in the finished polymer can be controlled by varying the mole ratio of tricarboxylic acid (d) to bisamoalkyl polytetrahydrofuran (c). An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching it should be noted that polymers of this invention, when prepared from preformed diimide-diacid, are substantially free of branching. If branching is desired, one needs only to introduce a branching agent such as trimellitic anhydride along with the preformed diimide-diacid. The amount of branching agent generally will be less than about 0.15 mole per mole of diimide-diacid or ester thereof. Useful branching agents other than trimellitic anhydride include, but are not limited to, trimethyl trimellitate, glycerol, trimethylol propane, trimesic acid and its esters, and the like.

Additionally, while not required, it is customary and preferred to utilize a catalyst or catalyst system in the process for the production of the polyether imide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the polymer.

Exemplary of the suitable known catalysts there may be given the acetates, carboxyltaes, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts, as well as additional useful catalysts are described in U.S. Pat. Nos. 2,465,319, 2,534,028, 2,850,483, 2,892,815, 2,937,160, 2,998,412, 3,047,549, 3,110,693 and 3,385,830, among others, incorporated herein by reference.

Where the reactants and reactions allow, it is preferred to use the titanium catalysts including the inorganic and organic titanium containing catalysts, such as those described, for example, in U.S. Pat. Nos. 2,720,502, 2,727,881, 2,729,619, 2,882,348, 2,906,737, 3,047,515, 3,056,817, 3,056,818, and 3,075,952, all of which are incorporated herein by reference. Especially preferred are the organic titanates such as tetra-butyl titanate, tetra-isopropyl titanate, and tetra-octyl titanate and the complex titanates derived from alkali or alkaline earth metal alkoxides and titanate esters, most preferably organic titanates. These too may be used alone or in combination with other catalysts such as for example, zinc acetate, calcium acetate, magnesium acetate or antimony trioxide, and/or with a catalyst quencher as described. The catalyst should be used in catalytic amounts, i.e., from about 0.005 to about 2.0 percent by weight based on total reactants.

Both batch and continuous methods can be used for any stage of the ether imide ester polymer preparation. Polycondensation of the polyester prepolymer with the poly(oxy tetramethylene)diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

In a second embodiment of the instant invention rather than utilizing a bisaminoalkyl polytetrahydrofuran alone as component (c) a mixture of at least one bisaminoalkyl polytetrahydrofuran and at least one poly(oxy alkylene)diamine is used as component (c) in the preparation of the polyetherimide esters of the present invention. In this embodiment the mixture of bisaminoalkyl polytetrahydrofuran and a poly(oxy alkylene)diamine contains an amount of bisaminoalkyl polytetrahydrofuran which is effective to improve the hydrolytic stability of the resultant polyetherimide ester elastomer. Generally, this amount is at least about 30 mole percent, preferably at least about 40 mole percent, and more preferably at least about 50 mole percent. Mole percent of bisaminoalkyl polytetrahydrofuran is calculated based on the total amounts, in moles, of bisaminoalkyl polytetrahydrofuran and poly(oxy alkylene)diamine present in the mixture.

In general, when using the mixture of the two diamines of this embodiment it is preferred that the amount of bisaminoalkyl polytetrahydrofuran present not exceed about 95 mole percent, preferably not exceed about 90 mole percent, and more preferably not exceed about 85 mole percent.

The poly(oxy alkylene)diamines suitable for use in the mixtures of the present embodiment may be characterized by the following formula

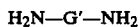  Ia.

wherein G' is the radical remaining after the removal of the amino groups of a long chain ether diamine. These polyether diprimary diamines are available commercially from Texaco Chemical Company under the trademark Jeffamine. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating the glycol with ammonia and hydrogen over a Nickel-Copper-Chromium catalyst as taught by U.S. Pat. No. 3,654,370. Other methods for the production thereof include those taught in U.S. Pat. Nos. 3,155,728 and 3,236,895 and French Pat. Nos. 1,551,605 and 1,466,708. All of the foregoing patents being incorporated by reference.

The long chain ether glycols suitable for use in the manufacture of the poly(oxy alkylene)diamines are polymeric glycols having terminal (or as nearly terminal as possible) hydroxy groups and a molecular weight of from about 600 to about 12,000, preferably from about 900 to about 4,000. Additionally, the long chain ether glycols will generally have a carbonto-oxygen ratio of from about 1.8 to about 4.3.

Representative long chain ether diamines are the poly(alkylene ether)diamines including poly(ethylene ether)daimine and poly(propylene ether)diamine; random or block copolymers of ethylene oxide and propylene oxide including propylene oxide and poly (propylene oxide) terminated poly(ethylene ether) diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly (alkylene ether)diamines are poly(ethylene ether) diamine and poly(propylene ether)diamine, and the poly(ethylene ether)glycols which are end-capped with poly(propylene ether) and/or propylene oxide and subsequently aminated.

In general, the poly(oxy alkylene)diamines useful within the scope of the instant invention have an average molecular weight of from about 600 to about 12,000, preferably from about 900 to about 4,000.

It is critical to the practice of the instant embodiment that the mixtures of bisaminoalkyl polytetrahydrofuran and poly(oxy alkylene)diamine contain at least about 30 mole percent of the bisaminoalkyl polytetrahydrofuran. Below this amount there is no noticeable improvement in the hydrolytic stability of the polyetherimide ester polymer.

As mentioned hereinafore the polyetherimide esters of this embodiment may also be prepared by a two-pot reaction involving the reaction of (a) the diol, (b) the dicarboxylic acid, and (e) a polyoxyalkylene diimide diacid. In this case the polyoxyalkylene diimide diacid will comprise a mixture of a diacid of Formual III and a polyoxyalkylene diimide diacid represented by the formula

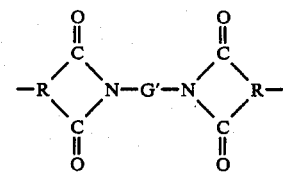  IIIa.

wherein G' and R are as defined hereinafore.

The diacid of Formula III is prepared by the reaction of the tricarboxylic acid component (d) with the bisaminoalkyl polytetrahydrofuran I while the diacid of Formula IIIa is prepared by the reaction of the tricarboxylic acid component (d) with the poly(oxy alkylene)diamine Ia.

In this two-pot process the amount of diacid III present in the mixture containing the diacid III and the diacid IIIa is an amount which is effective to improve the hydrolytic stability of the resultant polyetherimide ester. This amount is generally at least about 30 mole percent, preferably at least about 40 mole percent, and more preferably at least about 50 mole percent, based on the total amounts, in moles, of diacids III and IIIa present in the mixture. Generally, the amount of diacid III present in the mixture will not exceed about 95 mole percent, preferably about 90 mole percent, and more preferably about 85 mole percent.

In this embodiment wherein a mixture of diacids III and IIIa or a mixture of the bisaminoalkyl polytetrahydrofuran and a poly(oxy alkylene) diamine are used as components (e) or (c) respectively the polyetherimide ester polymers will contain at least the following three recurring structural units: IV, V and a structural unit represented by the formula

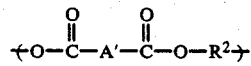  IVa wherein $R^2$ is as defined hereinafore and A' is the residue of the polyoxyalkylene diimide diacid prepared by the reaction of a tricarboxylic acid with the poly(oxy alkylene)diamine other than bisaminoalkyl polytetrahydrofuran, e.g.,

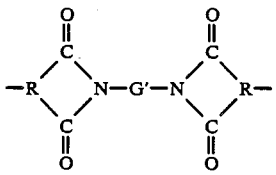

wherein R and G' are as defined hereinafore.

Since the amounts of units IV and IVa present in the polyetherimide ester polymer are related to and in general dependent upon the respective amounts of bisaminoalkyl polytetrahydrfuran and poly(oxy alkylene) diamine present in the reaction mixture, the polymers of this embodiment will contain at least about 30 mole percent, preferably at least about 40 mole percent, and more preferably about 50 mole percent of units IV based upon the total amounts, in moles, of units IV and IVa present in the polymer.

Although the copolyetherimide esters of this invention possess good resistance toward heat aging and photodegradation, it is advisable to stabilize these compounds by the addition of an antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S. Pat. No. 4,556,688, incorporated herein by reference.

The instant compositions may be stabilized against ultraviolet radiation by the addition thereto of the well known and commonly used ultraviolet radiation absorbers such as, for example, the substituted benzophenones and benzotriazoles.

Further, the properties of these polymers can be modified by incorporation of various conventional and well known inorganic fillers such as carbon black, silica gel, alumina, clays, and chopped fiberglass. These may be incorporated in amounts up to about 50% by weight, preferably up to about 30% by weight.

The polymers of the instant invention may also optionally contain the various well known flame retardants such as, for example, the halogen and/or sulfur containing organic and inorganic compounds.

DESCRIPTION OF THE PREFERRED EMBODIMENT

The following examples are presented to more fully and clearly illustrate the present invention. They are presented as illustrative of the present invention and are not to be construed as limiting thereof. In the examples all parts and percentages are on a weight basis unless otherwise indicated.

The following examples illustrate polyetherimide esters falling outside the scope of the instant invention. they are presented for comparative purposes only.

EXAMPLE 1

This example illustrates a polyetherimide ester derived from a long chain propylene ether diimide diacid.

Into a reactor vessel are placed 177 parts by weight of butanediol, 259 parts by weight of a polyoxyalkylene diimide diacid (prepared by the imidization of trimellitic anhydride with JEFFAMINE D2000, a propylene ether diamine having an average molecular weight of 2,000, available from Texaco Chemical Company), 225 parts by weight of dimethyl terephthalate, and a titanium catalyst and a phenolic antioxidant. The mixture is heated to about 180° C. whereupon methanol is generated. After the theoretical amount of methanol is removed the pot temperature is increased to about 250° C., and a vacuum is applied to produce the polyetherimide ester.

The flexural properties, i.e., tensile strength in accordance with ASTM D 638 and % tensile elongation in accordance with ASTM D 638, are measured and the results are set forth in Table I. The polymer is then autoclaved at 250° F. for 8, 24, 32 and 48 hours and the % retention of tensile strength is measured and the results are set forth in Table II; while the % retention of tensile elongation after autoclaving is set forth in Table III.

EXAMPLE 2

This example illustrates a polyetherimide ester derived from a long chain ethylene ether diimide diacid.

Into a reactor vessel are placed 177 parts by weight of butanediol, 259 parts by weight of a polyoxyalklene diimide diacid (prepared by the imidization of trimellitic anhydride with JEFFAMINE ED 2001, an ethylene ether diamine having an average molecular weight of 2001 available from the Texaco Chemical Company), 225 parts by weight of dimethyl terephthalate, a phenolic antioxidant, and a titanium catalyst. The mixture is heated to about 180° C. whereupon methanol is generated. After the theoretical amount of methanol is removed the pot temperature is increased to about 250° C. and a vacuum applied to produce the polyetherimide ester. The flexural properties are measured, both before and after autoclaving, as in Example 1, and the results are set forth in Tables I-III.

The following example illustrates a polyetherimide ester of the instant invention.

EXAMPLE 3

This example illustrates a polyetherimide ester polymer derived from a long chain tetramethylene ether diimide diacid.

Into a reactor vessel are placed 177 parts by weight of butanediol, 259 parts by weight of a polyoxyalkylene diimide diacid (prepared by the imidization of trimellitic anhydride, BASF's bis-(3-aminopropyl)-polytetrahydrofuran 2100, a tetramethylene ether diamine having an average molecular weight of 2100), 225 parts by weight of dimethyl terephthalate, a phenolic antioxidant, and a titanium catalyst The mixture is heated to about 180° C. whereupon methanol is generated. After the theoretical amount of methanol is removed the pot temperature is raised to about 250° C. and a vaccum applied to produce the polyetherimide ester of the present invention. The tensile properties are determined before and after autoclaving in accordance with the procedure of Example 1, and the results are set forth in Tables I-III.

TABLE I

| Example No. | Tensile Strength | % Tensile Elongation |
|---|---|---|
| 1 | 2100 psi | 260 |
| 2 | 2900 psi | 620 |
| 3 | 1700 psi | 170 |

TABLE II (% Retention of Tensile Strength vs. Autoclave Time)

| Example No. | 8 hrs. | 24 hrs. | 32 hrs. | 48 hrs. |
|---|---|---|---|---|
| 1 | 98% | 87% | 81% | 78% |
| 2 | 82% | 71% | 68% | 58% |
| 3 | 100% | 100% | 100% | 98% |

TABLE III (% Retention of Tensile Elongation vs. Autoclave Time)

| Example No. | 8 hrs. | 24 hrs. | 32 hrs. | 48 hrs. |
|---|---|---|---|---|
| 1 | 82% | 63% | 36% | 33% |
| 2 | 80% | 64% | 64% | 29% |
| 3 | 71% | 58% | 87% | 54% |

As illustrated by the data in Table II the polymer of the instant invention (Example 3) exhibits greater retention of tensile strength after autoclaving than do the polymers falling outside the scope of the present invention (Examples 1 and 2). While, as illustrated by the data in Table III, the retention of the tensile elongation exhibited by the polymer of the instant invention after short exposure to autoclaving is less than that of the polymers of Examples 1 and 2, after prolonged exposure to autoclaving the retention of tensile elongation of the polymer of Example 3 is superior to that of the polymers of Examples 1 and 2. This clearly illustrates that the polymer of the instant invention has improved hydrolytic stability as compared with the conventional polymers (Examples 1 and 2) falling outside the scope of the instant invention.

In a preferred embodiment the instant polyetherimide polymers are free of dimer acids, either as one of the dicarboxylic acid reactants or as an additional reactant, e.g., in addition to another dicarboxylic acid such as dimethyl terephthalate.

The polymers of the instant invention may be used in the preparation of extruded or injection molded articles.

Obviously, other modificatuons and variations of the present invention are possible in light of the above teachings. It is, therefore, to be understood that changes may be made in the particular embodiments of the present invention which are within the full intended scope of the invention as defined by the appended claims.

What is claimed is:

1. A polyetherimide ester composition exhibiting improved hydrolytic stability comprising the reaction products of:
   (i) at least one diol;
   (ii) at least one dicarboxylic acid or an ester forming reactive derivative thereof; and
   (iii) a set of reactants selected from
      (a) (i) an amount at least effective to improve the hydrolytic stability of said composition of at least one high molecular weight bisaminoalkyl polytetrahydrofuran, and (ii) at least one tricarboxylic acid or derivative thereof, or
      (b) an amount at least effective to improve the hydrolytic stability of said composition of at least one polyoxytetramethylene dialkylenediimide diacid.

2. The composition of claim 1 wherein (iii) is (a).

3. The composition of claim 2 wherein (iii)(a)(i) contains a mixture of bisaminoalkyl polytetrahydrofuran and another high molecular weight poly(oxy alkylene) diamine which is different from said bisaminoalkyl.

4. The composition of claim 3 wherein said mixture contains at least about 30 mole percent of bisaminoalkyl polytetrahydrofuran.

5. The composition of claim 4 wherein said mixture contains at least about 40 mole percent of bisaminoalkyl polytetrahydrofuran.

6. The composition of claim 5 wherein said mixture contains at least about 50 mole percent of said bisaminoalkyl polytetrahydrofuran.

7. The composition of claim 3 wherein said bisaminoalkyl polytetrahydrofuran is represented by the formula $$H_2N-R^1-G-R^1-NH_2$$

wherein:
   $R^1$ is independently selected from alkylene radicals containing from 2 to about 6 carbon atoms; and
   G is the radical remaining after removal of the amino groups of a long chain tetramethylene ether diamine and has an average molecular weight of from about 600 to about 12,000.

8. The composition of claim 7 wherein said other poly(oxy alkylene)diamine is represented by the formula $$H_2N-G'-NH_2$$

wherein G' is the radical remaining after the removal of the amino groups of a long chain alkylene ether diamine and the poly(oxy alkylene)diamine has an average molecular weight of from about 600 to about 12,000.

9. The composition of claim 8 wherein said other poly(oxy alkylene)diamine is selected from poly(ethylene ether)diamine, poly(propylene ether) diamine, or mixtures thereof.

10. The composition of claim 2 wherein (iii)(a)(i) contains 100 mole percent of at least one bisaminoalkyl polytetrahydrofuran.

11. The composition of claim 10 wherein said bisaminoalkyl polytetrahydrofuran is represented by the general formula $$H_2N-R^1-G-R^1-NH_2$$

wherein:
   $R^1$ is independently selected from alkylene radicals containing from 2 to about 6 carbon atoms; and
   G is the radical remaining after the removal of the amino groups from a long chain tetramethylene ether diamine having an average molecular weight of from about 600 to about 12,000.

12. The composition of claim 11 wherein $R^1$ is the propylene radical.

13. The composition of claim 1 wherein (iii) is (b).

14. The composition of claim 13 wherein (iii)(b) contains a mixture of at least one polyoxytetramethylene dialkylenediimide diacid and at least one other polyoxyalkylene diimide diacid.

15. The composition of claim 14 wherein said mixture contains at least about 30 mole percent of said polyoxytetramethylene dialkylenediimide diacid.

16. The composition of claim 15 wherein said mixture contains at least about 40 mole percent of said polyoxytetramethylene dialkylenediimide diacid.

17. The composition of claim 16 wherein said mixture contains at least about 50 mole percent of said polyoxytetramethylene dialkylenediimide diacid.

18. The composition of claim 13 wherein said polyoxytetramethylene dialkylenediimide diacid is represented by the general formula

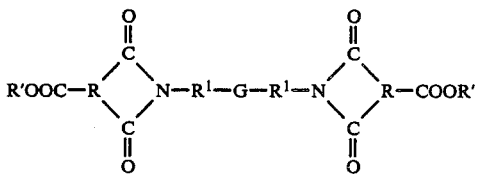

wherein:
- $R^1$ is independently selected from alkylene radicals containing from 2 to about 6 carbon atoms;
- R' is independently selected from hydrogen or monovalent $C_1$-$C_6$ aliphatic or cycloaliphatic radicals or monovalent $C_6$-$C_{12}$ aromatic radicals;
- R is a trivalent $C_2$-$C_{20}$ aliphatic or cycloaliphatic radical or a trivalent $C_6$-$C_{20}$ aromatic radical; and
- G is the radical remaining after the removal of the amino groups from a long chain tetramethylene ether diamine having an average molecular weight of from about 600 to about 12,000.

19. The composition of claim 14 wherein said other polyoxyalkylene diimide diacid is represented by the general formula

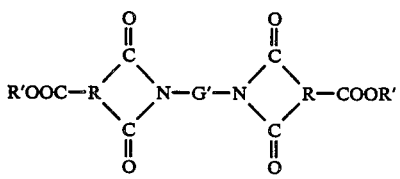

wherein:
- R' is independently selected from hydrogen or monovalent $C_1$-$C_6$ aliphatic or cycloaliphatic radicals or monovalent $C_6$-$C_{12}$ aromatic radicals;
- R is independently selected from trivalent $C_2$-$C_{20}$ aliphatic or cycloaliphatic radicals or trivalent $C_6$-$C_{20}$ aromatic radicals; and
- G is the radical remaining after the removal of the amino groups from a long chain alkylene ether diamine having an average molecular weight of from about 600 to about 12,000.

20. The composition of claim 19 wherein said polyoxyalkylene diimide diacid is selected from polyoxyethylene diimide diacid, polyoxypropylene diimide diacid, or mixtures thereof.

21. The composition of claim 13 wherein (iii)(b) contains 100 mole percent of at least one polyoxytetramethylene dialkylenediimide diacid.

22. The composition of claim 21 wherein said polyoxytetramethylene dialkylenediimide diacid is polyoxytetramethylene dipropylenediimide diacid.

23. The composition of claim 1 wherein the diol component (i) is selected from $C_2$ to $C_9$ aliphatic or cycloaliphatic diols, or mixtures thereof.

24. The composition of claim 23 wherein said diol component contains 1,4-butanediol.

25. The composition of claim 23 wherein said diol component contains mixture of 1,4-butanediol and butenediol or cyclohexane dimethanol.

26. The composition of claim 1 wherein said said dicarboxylic acid component (ii) is selected from $C_2$ to $C_{19}$ aliphatic or cycloaliphatic dicarboxylic acids or $C_6$-$C_{16}$ aromatic dicarboxylic acids.

27. The composition of claim 26 wherein at least about 60 mole percent of the dicarboxylic acids are the same.

28. The composition of claim 27 wherein at least about 80 mole percent of the dicarboxylic acids are the same.

29. The composition of claim 26 wherein said dicarboxylic acid is selected from dicarboxylic aromatic acids.

30. The composition of claim 29 wherein said aromatic dicarboxylic acid is dimethyl terephthalate.

31. The composition of claim 1 wherein said tricarboxylic acid (iii)(a)(ii) is represented by the formula

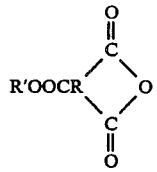

wherein:
- R is a trivalent $C_2$ to $C_{20}$ aliphatic or cycloaliphatic radical or a $C_6$-$C_{20}$ trivalent aromatic radical; and
- R' is hydrogen or a monovalent $C_1$-$C_6$ aliphatic or cycloaliphatic radical or monovalent $C_6$-$C_{12}$ aromatic radical.

32. The composition of claim 31 wherein said tricarboxylic acid is trimellitic anhydride.

33. The composition of claim 1 wherein the weight ratio of the reaction product of (iii)(a)(i) and (iii) (a)(ii) or of (iii)(b) to the dicarboxylic acid (ii) is from about 0.25 to about 2.0.

34. The composition of claim 33 wherein said weight ratio is from about 0.4 to about 1.4.

35. The composition of claim 1 which further contains a stabilizer.

* * * * *